Aug. 9, 1949.　　　　　L. S. WILBUR　　　　2,478,614

COOKING HEAT CONTROL PLATE ASSEMBLY

Filed July 14, 1945

Inventor
Lawrence S. Wilbur by　The Firm of Charles W. Hills　Attys

Patented Aug. 9, 1949

2,478,614

UNITED STATES PATENT OFFICE 2,478,614

COOKING HEAT CONTROL PLATE ASSEMBLY

Lawrence S. Wilbur, Chicago, Ill.

Application July 14, 1945, Serial No. 605,141

6 Claims. (Cl. 126—215)

This invention relates to a novel cooking plate assembly and more particularly to an adjustable cooking plate assembly adapted for use with the usual conventional stoves, burners, electric plates, and the like.

An object of this invention is to provide a cooking plate assembly which can be employed by the housewife in such a manner as to enable a finer adjustment of the cooking temperature than is possible with the usual adjusting mechanism on a stove or burner.

Yet another object of this invention is to provide a cooking plate assembly which lends itself to quick dismantling for purposes of cleaning and which at the same time may be very economically manufactured.

A further object of the invention is to provide a cooking plate assembly which by reason of the adjustments afforded therein enables waterless cooking of vegetables and other edible food products.

Yet another object of the invention is to provide a multiple plate assembly wherein plates may be added or subtracted as desired and wherein very fine adjustment of the ultimate effective cooking temperature may be effected through the mere relative movement of the plates.

In accordance with the general features of this invention, there is provided in a cooking plate assembly a plurality of superimposed cooking plates, means for relatively moving them and means operated by the relative movement to vary the spacing between the plates and to thereby vary the effective cooking temperature of the uppermost plate.

Another feature of the invention relates to the forming of one of the plates in the foregoing assembly as a base plate and to so forming the other superimposed plates thereabove that they may be readily interchanged or removed from the assembly as desired.

In accordance with still other features of the invention, the means for effecting adjustment of the spacing between the plates is provided in the form of stepped shoulders on certain of the plates cooperating with depending projections on the undersides of other of the plates, the projections being adapted to ride up or down the stepped shoulders in accordance with the direction of the relative rotation of the plates.

Figure 1:
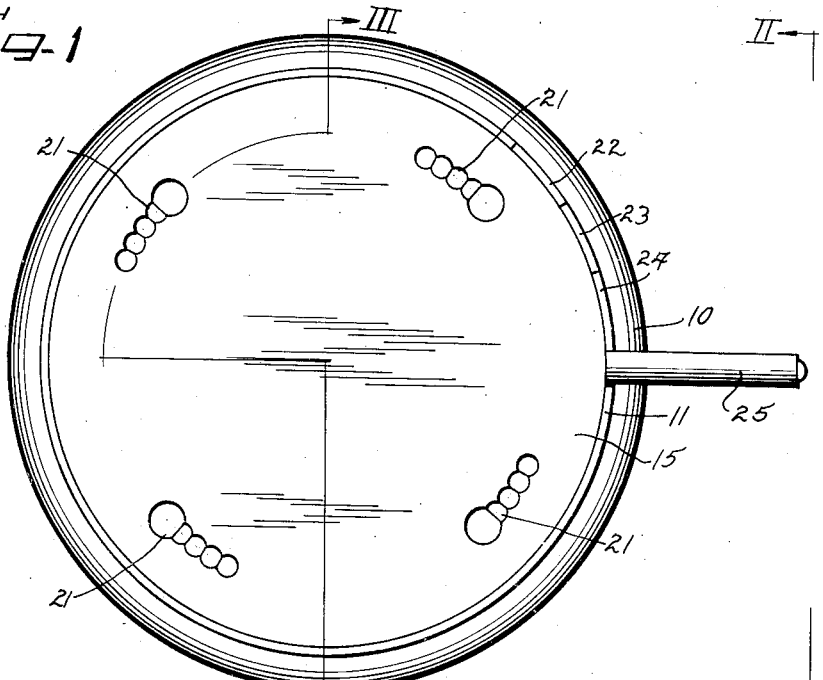
Figure 2:
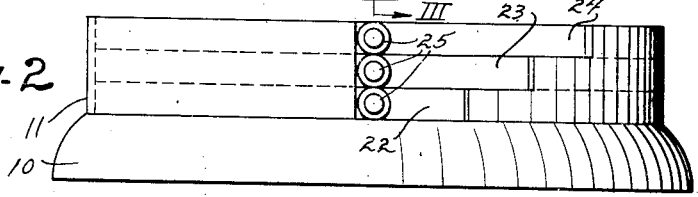
Figure 3:
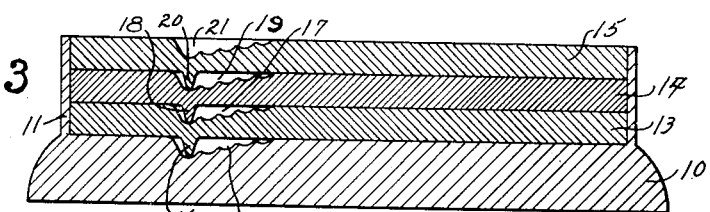
Figure 4:
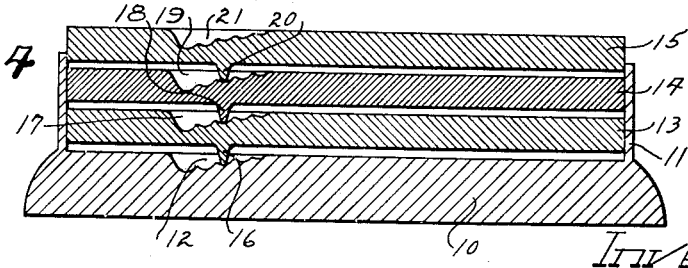

Other objects and features of this invention will more fully appear from the following detailed description taken in connection with the accompanying drawings which illustrate a single embodiment thereof, and in which Figure 1 is a plan view of my novel cooking plate asembly;

Figure 2 is a side elevation of the assembly shown in Figure 1 and taken on substantially the line II—II looking in the direction indicated by the arrows;

Figure 3 is an irregular cross-sectional view taken on substantially the line III—III of Figure 1 looking in the direction indicated by the arrows and showing the superimposed plates in direct contact with each other; and Figure 4 is a cross-sectional view similar to Figure 3 but illustrating the plates in spaced relationship by reason of the relative rotation of the plates, and whereby heating of the top plate may be effected by convection.

As shown on the drawings:

The nested cooking plate assembly of my invention comprises a base plate 10 having an upstanding skirt or flange 11 in which is telescopingly nested a series of superimposed plates 13, 14 and 15. One or more of these upper plates may be used with the base plate as is desired and depending upon the fineness of the adjustment in temperature desired.

The base plate 10 may be made of any suitable metal although I perferably contemplate making it of cast iron. The upper plates 13, 14 and 15 may also be made of any suitable metal although for purposes of appearance and cleanliness, I contemplate having them made of aluminum.

The base plate 10 may be made of a size to fit over the conventional stove burner and is adapted for use with either electric, gas, coal or oil burners.

The upper surface of the base plate 10 is recessed to form a plurality of indented stepped shoulders 12 and the upper surfaces of each of the plates 13, 14 and 15 are similarly recessed to provide them with stepped shoulders 17, 19 and 21. In order to enable a proper balance of the superimposed plates, I provide all of these recessed shoulders in sets of four on each of the plates including the base plate. These stepped shoulders will appear in exactly the same spaced relationship on the upper side of each of the plates as is illustrated in the case of the shoulders 21 of the top plate 15 as shown in Figure 1. Also, as clearly shown in Figure 1, the widest step of each of the shoulder means is the lowermost step and the narrowest one is the uppermost step.

The superimposed plates 13, 14 and 15 nested in the base plate 10 are each provided on its underside with downwardly depending projections corresponding in number to the number of stepped shoulders on the immediately lower plate. While I have selected sets of four shoulders and four projections in the case of each set of plates, it is, of course, clear that this number may be varied as desired as long as a proper balance and support of the superimposed plates is provided for. I have designated the downwardly depending projections on the plates 13, 14 and 15 by the numerals 16, 18 and 20, respectively.

Furthermore, as is clear from Figures 1 and 2, the skirt or flange 11 of the base plate 10 is provided with a series of staggered notches 22, 23 and 24 into which notches indentical handles 25 on the three superimposed upper plates 13, 14 and 15 project. These handles are provided for relatively moving or rotating the plates with respect to themselves and with respect to the base portion or plate 10.

In Figure 3 I have illustrated the plates 13, 14 and 15 all in substantial contact. When in this position the handles 25 will be vertically aligned as shown in Figure 2.

In Figure 4, I have illustrated all of the plates as being slightly spaced from each other and this is accomplished by relatively rotating the plates through the means of the handles 25 which will no longer be in vertical alignment but will be in different positions in their respective notches or slots 22, 23 and 24 depending upon the degree of movement.

It is also clear that the uppermost plate 15 may be turned relative to the lowermost plate without disturbing the relationship of the lower plates to each other. Similarly, the middle handle 25 may be moved to move the two upper plates together without moving the lower plate 13 or without separating the two upper plates 14 and 15. It is also clear that by moving the lowermost plate by its handle 25, all three plates 13, 14 and 15 may be rotated as a unit, in which event the lowermost set of projections 16 will ride upwardly on the stepped shoulders 12 spacing the superimposed upper plates from the base plate 10.

In addition it is contemplated that the steps in each of the shoulders 12, 17 and 19 may be varied in accordance with the number of adjustments desired. The upper plate 15 is also provided with stepped shoulders 21 so that it can be interchangeably used with either of the lower plates 13 and 14. In fact, the three plates 13, 14 and 15 are all identical in construction. This is highly desirable since it greatly cheapens the cost of manufacturing the superimposed upper plates.

Many different degrees of adjustment or spacing of the plates is enabled by the foregoing arrangement. Obviously, when the plates are in contact as shown in Figure 3, heat is transferred by conduction, and then by varying the spacing between the plates, it is possible to vary the amount of heat transmitted by convection and radiation from one plate to the other upwardly to the effective cooking area. In this way, the effective cooking temperature may be very finely adjusted in accordance with the requirements of the particular housewife. The gradations of adjustment possible by the foregoing arrangement of superimposed plates are almost unlimited. In any event, it is clear that between the ordinary ranges of heat adjustment on a given burner, it is possible through the use of my device to obtain additional and finer adjustment consistent with the requirements of the particular edible being cooked. Through the use of these adjustable plates, it is feasible for the housewife to use this cooking plate assembly as a waterless cooker since the product such as vegetables may be placed in a vessel over the uppermost plate and cooked very slowly without burning.

I purposely make the base plate 10 which is the plate to rest on the burner of a heavier construction than that of the superimposed upper plates 13, 14 and 15, although this is not essential to the use of my invention. In addition, I find that a satisfactory adjustment can be effected by having each step of the shoulders of such depth as to enable a spacing of about $\tfrac{1}{32}$ of an inch for each one. This again, however, may be varied in accordance with the desires of the particular manufacturer.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a cooking plate assembly a plurality of superimposed cooking plates, means for relatively moving them, means operative by said relative movement to vary the spacing between said plates and to thereby vary the effective cooking temperature of the uppermost plate, at least one of said plates having a marginal flange in which another of said plates is nested, said spacing varying means comprising stepped shoulders on one plate and projection means on the other engaging said shoulders, said projection means being arranged to ride upon the steps of said shoulder means upon relative movement of said plates.

2. In a cooking plate assembly a base plate recessed on the upper side thereof to provide a plurality of shoulders and a plurality of superimposed relatively rotatable plates disposed on top of said base plate, the plate immediately on top of said base plate having extending from its underside projecting means for cooperation with the stepped shoulders on the base plate and also having on its top side a depression pattern in the form of a plurality of stepped shoulders, the plate immediately thereover having on its underside projection means for cooperation with the stepped shoulders on the plate resting on the base plate, said superimposed plates being relatively rotatable to vary the distance separating them from each other and from the base plate so as to vary the amount of heat transmitted to the uppermost plate by radiation and convection.

3. In a cooking plate assembly a base plate recessed on the upper side thereof to provide a plurality of shoulders and a plurality of superimposed relatively rotatable plates disposed on top of said base plate, the plate immediately on top of said base plate having extending from its underside projecting means for cooperation with the stepped shoulders on the base plate and also having on its top side a depression pattern in the form of a plurality of stepped shoulders, the plate immediately thereover having on its underside projection means for cooperation with the stepped shoulders on the plate resting on the base plate, said superimposed plates being relatively rotatable to vary the distance separating them from each other and from the base plate so as to vary the heat transmitted by radiation and convection to the uppermost plate, and means for relatively moving said superimposed plates comprising handle means on at least one of the superimposed plates.

4. In a cooking heat control plate assembly, a base plate, an upstanding peripheral flange on said base plate, a plate superimposed upon said base plate and guided for rotational movement by said flange, and cooperating means on said base plate and said superimposed plate for elevating said superimposed plate relative to the base plate upon relative rotation of the plates, said means comprising a plurality of depressions in the surface of one of said plates opposing the other plate and having a plurality of graduated shoulders and projections from the opposing surface of said other plate being selectively engageable with said shoulders in the relative rotation of the plates.

5. In a cooking plate assembly of the character described, a base plate having an upstanding marginal flange, a second plate superimposed upon said base plate within said marginal flange, said flange having a peripheral slot therein, a handle projecting from superimposed plate outwardly through said slot and adapted to be manipulated to rotate the superimposed plate relative to the base plate, and means operative between said plates to vary the spacing between the plates to effect the cooking temperature condition between the plates responsive to relative rotation of said superimposed plate through the medium of said handle, the ends of the slot defining the limits of relative rotation of said superimposed plate.

6. In combination in a cooking heat control plate assembly, a base plate, said base plate having a peripheral upstanding flange, a plurality of superimposed plates supported by the base plate within said flange and said superimposed plates being rotatable relative to the base plate and to each other, each of said superimposed plates having an individual handle projecting radially therefrom, said flange having a graduated opening therein through which the handles project, and means between the opposing faces of the several plates operable in the relative rotation of the plates to effect a variable spacing between the plates, said graduated opening having a lower portion limiting movement of the handle of the lowermost of the superimposed plates to a predetermined range of rotary movement of said lowermost plate and having progressively larger graduated portions upwardly from said lowermost portion permitting progressive additional rotary movement of the successive upper plates for varying the spacing between the plates selectively.

LAWRENCE S. WILBUR.

REFERENCES CITED

The following references are of record in the file of this patent:

UNITED STATES PATENTS

| Number | Name | Date |
| --- | --- | --- |
| 534,034 | Dillenbeck et al. | Feb. 12, 1895 |
| 549,836 | Vannan | Nov. 12, 1895 |
| 727,251 | Allen | May 5, 1903 |
| 990,102 | Brewer | Apr. 18, 1911 |
| 1,072,097 | DeAngelis | Sept. 2, 1913 |
| 1,140,529 | Rice | May 25, 1915 |
| 1,167,516 | Pearce | Jan. 11, 1916 |
| 1,386,303 | Armstrong | Aug. 2, 1921 |
| 1,786,562 | Endorf | Dec. 30, 1930 |
| 1,989,284 | McLeod | Jan. 29, 1935 |
| 2,010,180 | DeFerranti | Aug. 6, 1935 |
| 2,371,410 | Rickenbacker | Mar. 13, 1945 |

FOREIGN PATENTS

| Number | Country | Date |
| --- | --- | --- |
| 329,856 | Germany | Dec. 1, 1920 |